June 1, 1954 R. N. RHODES 2,680,147

DISTORTION ELIMINATOR

Filed Dec. 31, 1952 3 Sheets-Sheet 1

INVENTOR.
Roland N. Rhodes
BY [signature]
ATTORNEY

INVENTOR.
Roland N. Rhodes
BY Louis J. Mitchell
ATTORNEY

June 1, 1954 R. N. RHODES 2,680,147

DISTORTION ELIMINATOR

Filed Dec. 31, 1952 3 Sheets-Sheet 3

INVENTOR.
Roland N. Rhodes
BY [signature]
ATTORNEY

Patented June 1, 1954 2,680,147

UNITED STATES PATENT OFFICE 2,680,147

DISTORTION ELIMINATOR

Roland N. Rhodes, New Brunswick, N. J., assignor to Radio Corporation of America, a corporation of Delaware Application December 31, 1952, Serial No. 328,916

4 Claims. (Cl. 178—5.4)

The present invention relates to methods and apparatus for substantially reducing crosstalk between two signals that are represented at least in part by the phase of a single carrier.

For example, in one color television system such a carrier may be generated in the following manner. A first alternating current wave having a predetermined phase is amplitude modulated in accordance with the amplitude variations of a first color signal and a second alternating current wave that is in phase quadrature with the first wave is amplitude modulated in accordance with the variations of a second color signal. These color signals may represent pure colors or combinations of colors. The amplitude modulated waves are then added in linear fashion so as to produce a single resultant color carrier having the same frequency as the first and second alternating current waves. The phase of the color carrier may vary through 360° if balanced modulation or other known modulation techniques are used and its phase will depend on the relative amplitudes and polarities of the first and second alternating current waves or in other words the phase depends on the hue represented by these waves.

The frequency of the alternating current waves and hence the frequency of the color carrier is generally so chosen as to be located near the upper end of the video pass band of the system. In order to recover the first color signal at a receiver the color carrier is heterodyned with a third alternating current wave corresponding in phase to the first alternating current wave. The second color signal is recovered by hetrodyning the carrier with a fourth alternating current wave corresponding in phase to the second alternating current wave. These third and fourth alternating current waves would, therefore, also be in phase quadrature.

In this system the frequency response characteristic of the receiver generally has a substantially linear slope at the high frequency end such that the color carrier falls at a 50% amplitude response point. This means that the upper sidebands of the color carrier are recovered with less amplitude than the lower sidebands. For reasons which will become more apparent in the discussion to follow, this produces crosstalk between the color signals that appears as positive or negative pulses, depending on the particular sequence of hues along a line of the raster. The presence of these pulses therefore causes the area of transition from one hue to another to be darker than they should be and other areas of transition to be lighter. If a particular hue transition is reversed, that is instead of going red to blue the sequence of colors is from blue to red, the polarity of the pulses in the area of hue transition is reversed.

A detailed analysis of the sidebands of the color carrier is extremely complex and therefore their precise nature is not easily explained. The information carried by the frequencies of the upper sideband that extend beyond the cut-off point of the receiver frequency response characteristic is lost. If the color sequences along a line are reversed, then the information formerly carried by the upper sideband is carried by the lower sideband. If, as proposed in the U. S. patent application for a color phase alternation system bearing Serial No. 220,622, filed on April 12, 1951 in the name of G. C. Sziklai et al., entitled "Multiplex Signalling System," the phase of one of the waves that are modulated with one of the color signals at the transmitter is shifted by 180°, the phase shift of the carrier is reversed for a given hue sequence and the information carried by the upper and lower sidebands is interchanged. Hence two scans of a given line can place all the desired information in the lower sideband of the carrier so that the average of the two scansions represents all of the information that resided in both sidebands before the upper sideband was cut off at the receiver. This reversal in phase can be used in different ways but generally the phase reversal takes place at field rate. Thus the average of points in adjacent lines of the raster that are in vertical registry corresponds to all the information in both sidebands. The phase reversal of one of the waves that are modulated at the transmitter and the consequent reversal of the direction of the phase shift of the color carrier for a given sequence of hues causes the crosstalk pulses that appear at an area of hue transition to reverse in polarity. Therefore, at areas of hue transition that are in vertical registry on adjacent lines, the crosstalk pulses have opposite polarities. As long as the eye sees the average of the light intensities produced in response to this crosstalk pulses, their presence is not harmful. However, there is a full field interval between the occurrence of the light impulses produced on a kinescope by these pulses, and under some conditions the eye does not average them but responds to the increase of light due to one of them and after this has faded it responds to the decrease in light due to the other. This means that areas of hue transition that are in vertical registry on adjacent lines will appear to flicker.

If each of the colors were transmitted with signals of equal amplitude ranges, and if the decay time of the phosphors employed in the kinescope were identical, then because the eye is more sensitive to green than it is to red and more sensitive to red than it is to blue the flicker on green edges would be more noticeable than it is on red edges and the flicker on red edges would be more noticeable than it is on blue edges. However, if the amplitude ranges of the color signals were inversely proportional to the eye's sensitivity to the colors represented by these signals, then the amount of flicker seen by the eye would be the same for all colors. At the present time however the decay time for suitable red and green phosphors is greater than the decay time for a suitable blue phosphor so that flicker is first noticeable on blue edges. If the decay time of the blue phosphors were increased, the eye would not have to retain the image for as long a time and the flicker would probably be less noticeable.

It should be understood that the invention is also applicable to color systems in which the phases assigned to the different color signals are not in quadrature. For example, in some systems the color signals are separated by 120°.

It is the object of this invention to provide an improved circuit for reducing the amount of edge flicker in a color system using color phase alternation and to eliminate dark and light edges when color phase alternation is not used.

As disclosed in the co-pending application of Robert K. Lockhart entitled "Distortion Eliminator," Ser. No. 328,957, filed December 31, 1952, the above-described undesired effects can be eliminated by cross feeding from a first color channel to a second a signal that is negative to the crosstalk signals present in the second channel so as to substantially cancel the crosstalk present therein. In accordance with an embodiment of the present invention an advantageous crosstalk elimination system is provided wherein such a separate correcting signal is derived from a separate demodulator.

The specific manner in which this objective can be attained in accordance with the principles of this invention will be better understood after a detailed discussion of the drawings in which.

Figures 1, 1A:
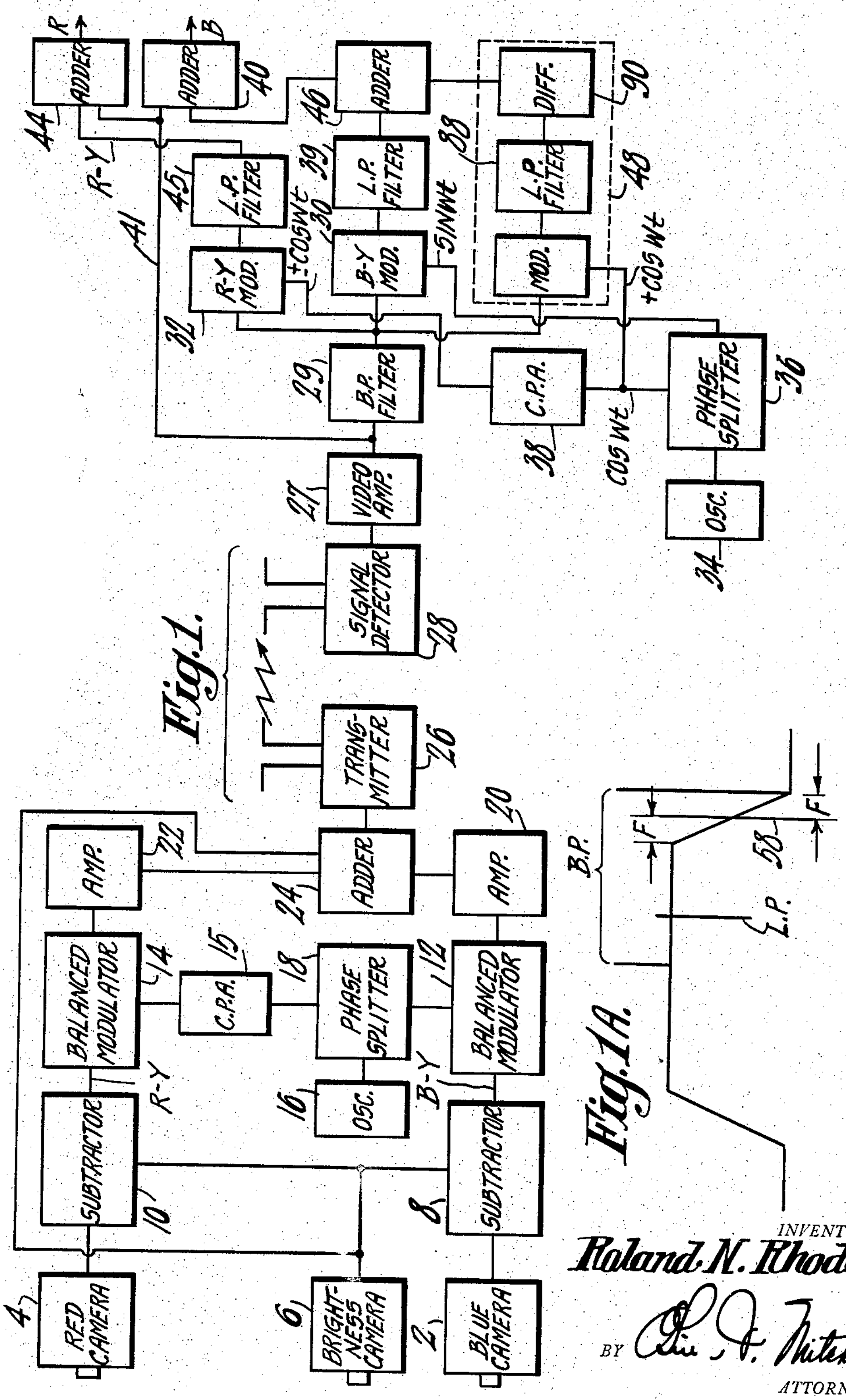
Figure 1 is a block diagram illustrating the manner in which the present invention can be incorporated in one version of the type of color television system set forth above.
Figure 1A illustrates the location of the color carrier with respect to the frequency response characteristic of the receiver of Figure 1.

In the color transmission system of Figure 1 the blue video signals are generated by a camera 2, the red video signals by a camera 4 and the brightness or Y signals by a camera 6. A subtractor 8 serves to subtract the brightness or Y signal from the blue video signal so as to yield a blue color difference signal B—Y. In a similar manner a subtractor 10 derives a red color difference signal R—Y. These color difference signals are a specific form of color signal used in the color system of Figure 1 in which the present invention may operate. It will be understood that other types of color signals could also be employed. The blue color difference signal is applied to a balanced modulator 12 so as to modulate a sine wave in such a manner that the phase of the wave is 0° for a positive B—Y signal and 180° for a negative B—Y signal. The red color difference signal is applied to a balanced modulator 14 so as to modulate a cosine wave in such manner that the phase of the wave is 90° for a positive R—Y signal and 270° for a negative R—Y signal during one field. If the system is to employ the color phase alternation principle discussed above, then the phase of the cosine wave is changed by 180° on the next field by a color phase alternation switching circuit 15 so that a positive R—Y signal produces a wave of 270° phase and a negative R—Y signal produces a wave of 90°. The sine and cosine waves are supplied by an oscillator 16 and a phase splitter 18. After being suitably amplified in amplifiers 20 and 22 the outputs of the modulators are combined with the output of the brightness camera in an adder 24 so as to form a composite signal that is transmitted in any suitable manner by a transmitter 26. The outputs of the modulators combine to produce a color carrier that is phase modulated with respect to hue and amplitude modulated with respect to the degree of color saturation. This carrier is the same frequency as the sine and cosine waves applied to the modulators and is combined with the brightness signal.

At the receiver the composite signal is recovered by any suitable signal detector 28 having a frequency response characteristic as indicated in Figure 1A and is applied via a video amplifier 27 and a band pass filter 29 having the frequency limits denoted by the bracket B—P in Figure 1A to a modulator or synchronous detector 30 wherein it is heterodyned with a sine wave of zero degrees phase having the same frequency as the sine wave applied to the modulator 12 at the transmitter. It is well known that if an amplitude modulated wave is heterodyned with an unmodulated wave of the same frequency and phase (i. e. either in-phase or 180° out-of-phase) that the amplitude modulations are recovered and therefore the output of the modulator 30 is the B—Y signal. The composite signal appearing at the output of the signal detector 28 is also applied to a modulator or synchronous detector 32 where it is heterodyned with a cosine wave having the same frequency and phase as the cosine wave applied to the modulator 14 at the transmitter. If the color phase alternation principle is employed, the phase of the cosine wave applied to the synchronous detector 32 is changed from 90° to 270° on successive fields so as to be synchronized with the cosine wave applied to the modulator 14 at the transmitter. The sine and cosine waves are derived from an oscillator 34 by a phase splitter 36 and the phase reversal of the cosine wave for purpose of color phase alternation are brought about by a color phase alternation switching circuit 38. The B—Y signal appearing at the output of the synchronous detector 30 is passed through a low pass filter 39 having an upper frequency limit designated by L. P. in Figure 1A and is then combined in an adder 40 with the composite signal that is supplied to the adder by a lead 41 in such manner that the Y components cancel each other and a blue video signal B remains. The red video signal R is similarly recovered by combining the R—Y and the brightness signals in an adder 44, after the R—Y signal has been limited in frequency by a low pass filter 45 that is similar to the low pass filter 39. The low pass filters 39 and 45 attenuate the frequencies passed by the band pass filter 29 so that only the products of modulation derived in the modulators reach the various adders.

Figures 2, 3, 4:
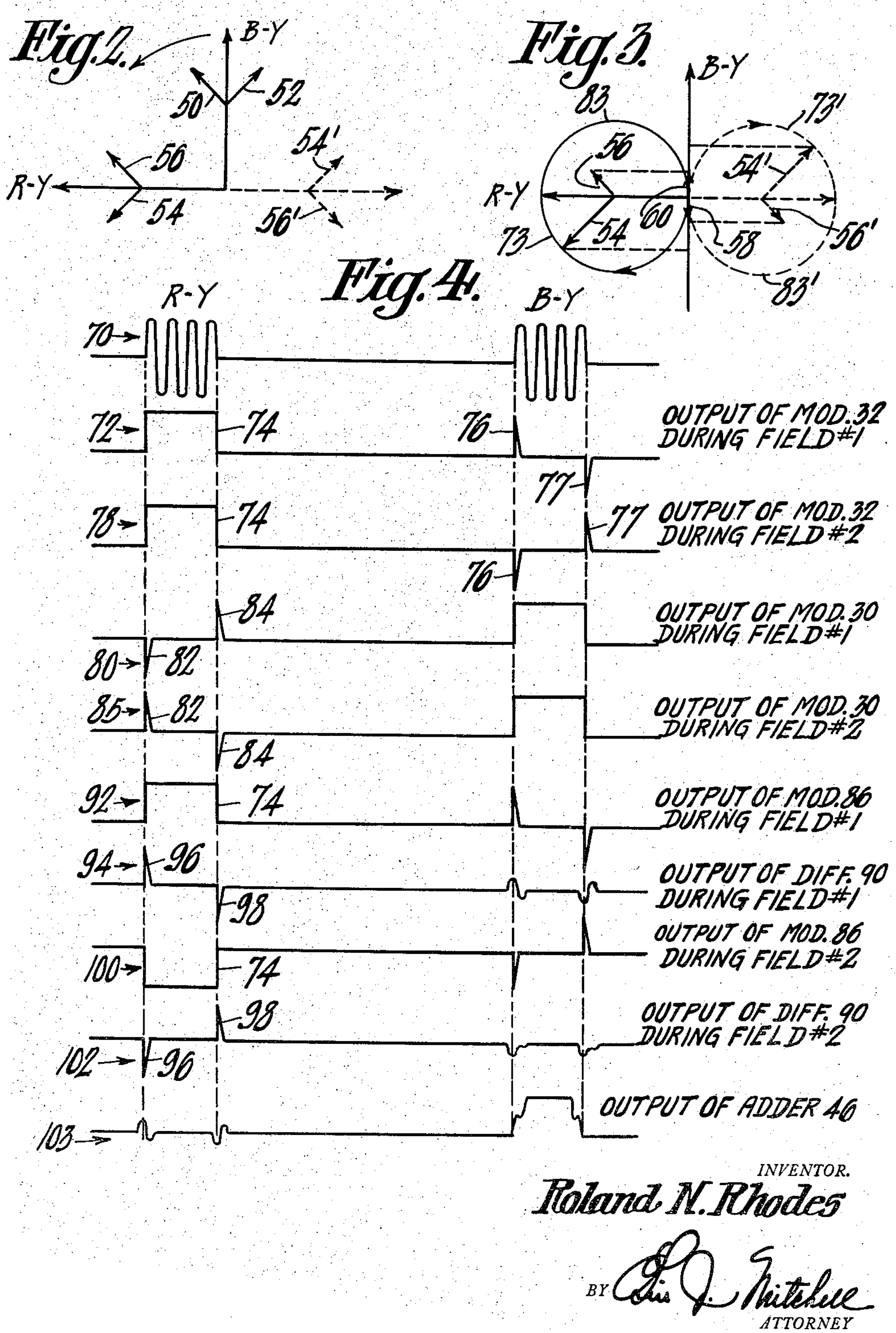
Figures 2 and 3 are vector diagrams used in explaining the origin of the crosstalk to be eliminated by the present invention.
Figure 4 is a series of graphs used in explaining the operation of the invention.

Thus far the color transmission system corresponds to that described in an article entitled "Principles of NTSC Compatible Color Television" appearing on pages 88–97 in the February 1952 issue of "Electronics." In accordance with this invention the B—Y signal is combined in an adder 46 with a crosstalk elimination signal supplied by a cross feeding circuit 48 included with the dotted rectangle. This circuit derives from the color carrier a cross talk elimination signal that is substantially the same as the differentiated output of the R—Y modulator 32 without the phase reversals produced by the color phase alternation. The following discussion will show how the system operates without the crossfeeding circuit in order that the nature of the crosstalk in the original system may be more clearly understood and the manner in which the cross feeding circuit must operate to eliminate the crosstalk more apparent. If the color carrier is located in a flat region of the frequency response characteristic of the receiver it may be represented by a vector diagram of Figure 2. It will be remembered that the color carrier was obtained by combining signals derived by amplitude modulating an alternating current wave of zero degrees phase or in other words a sine wave with the blue color difference signal B—Y and by modulating a cosine wave with the red color difference signal R—Y. The vectors B—Y and R—Y of Figure 2 illustrate the sine and cosine waves and as amplitude modulation produces two sidebands, the B—Y and R—Y vectors may be thought of as being the resultant of the side-band vectors 50, 52, 54 and 56 respectively. If color phase alternation is employed, the R—Y vector and its sidebands will be shifted by 180° so as to assume the dotted position on every other field. In recovering the B—Y signal, the color carrier is heterodyned with an unmodulated sine wave and in accordance with well established principles yields a signal that is the resultant of projections of all the vectors on the zero degree axis. The projections of the equal upper and lower R—Y sideband vectors 54 and 56 cancel each other during either field as one is positive and the other is negative.

Now if instead of being located in a flat region of the freqnency response characteristic of the signal detector 28, the color carrier is located in the middle of a sloping region such as indicated by the line 58 of Figure 1A, it will be seen that the upper sideband frequencies have less amplitude than the lower sideband frequencies, as indicated by the vector diagram of Figure 3. During the field represented by the solid lines the resultant of the projection of the R—Y sideband vectors 54′ and 56′ is a vector 58 that is at 180°. During the next field, the one represented by the dotted vectors, the resultant of the projections of the upper and lower sideband vectors 54′ and 56′ is a vector 60 equal in length to the vector 58 and having a zero degree phase. This means that the average effect of the crosstalk from the R—Y into the B—Y channel is zero for points on adjacent lines of the line interlaced raster that lie in a vertical registry. If the eye responds to this average, then the crosstalk is of little or no effect but if it doesn't, the effect of the crosstalk will be a flicker at field repetition rate.

The discussion above has been confined to the situation where the hue and hence the phase of the carrier remained constant and the intensity of the hue varied. Under these conditions both upper and lower sidebands are simultaneously present for frequencies not greater than F (see Figure 1A) and only one sideband was present for frequencies greater than F.

The precise operation of the system for changes on hue that are represented by changes in the phase of the color carrier is much more involved. Suffice it to say that a given color sequence along a scanned line of the raster may advance the phase of the carrier and produce dissimilar upper and lower sidebands. Part of the information about the change in hue, therefore, lies in one sideband and another part of the information lies in the other. However those upper sideband frequencies greater than F are cut off by the signal detector 28 of Figure 1.

If the order in which the various colors are represented by successive phases of the color carrier is reversed, then the information formerly represented by the upper sideband is now represented by the lower sideband. This means that information as to the hue change that resided in the original upper sideband and which was cut off by the signal detector can be represented by a lower sideband if the order of the colors represented by a given phase rotation of the carrier is reversed.

Whether color phase alternation is used or not, the fact still remains that the upper sideband frequencies have less and less amplitude as they deviate farther and farther from the frequency of the color carrier until they reach a frequency F at which frequency they have a zero amplitude. This means that the projection on the B—Y axis of the vector representing the upper sideband frequencies of the R—Y signal is not equal to a similar projection of the vector representing the lower sideband frequencies as their amplitude gets larger and larger with frequency deviation from the carrier. This is true even if the lower sideband frequencies are also limited to a frequency deviation from the carrier of F cycles. That these dissimilar projections of sideband vectors introduce crosstalk into the B—Y channel as a result of changes in the R—Y signal has been amply explained in connection with the vector diagram of Figure 3. The crosstalk for frequencies below F is therefore generally proportional to frequency.

The particular kind of crosstalk introduced from one channel to another may be better understood from the graphs of Figure 4 which represent the various signals involved along one line of the raster when the object being televised is comprised of vertical red and blue bars that are separated by a gray, black or white area. During the scansion of the red bar, the R—Y signal may modulate a wave of 90° phase, and during the scansion of the blue bar, the B—Y signal modulates a wave of 0° phase as indicated by the graph 70. A graph 72 indicates that during the red bar the R—Y synchronous detector 32 recovers the R—Y signal 74 representing the red bar. The blue bar produces positive and negative spikes 76 and 77 at its beginning and end respectively. Thus, the left side of the blue bar at this particular line in the raster would appear brighter and the right hand side would appear darker. These spikes appear because the inequality of the amplitudes of the upper and lower sidebands of the B—Y signal produced as a result of the shape of the frequency characteristic (Figure 1A) of the signal detector 28. This unequal projection on the R—Y axis produces a resultant that is detected by the R—Y detector. If the B—Y frequency were limited to F cycles so that the B—Y signals lay wholly within the double sideband region of operation the spikes would have an amplitude that is proportional to the frequencies involved in the B—Y signal and would by definition be a first derivative of the B—Y signal. Actually, however, the B—Y signal would normally contain frequencies greater than F that lie in the single sideband region and their projection on the R—Y axis does not change with frequency. Therefore, the spikes are not pure derivatives of the B—Y signal but may be approximated by the first derivative.

Graph 78 indicates the effects of color phase alternation on the signal recovered by the R—Y synchronous detector 32 during the next field and therefore on a different line of the raster. The alternating current wave modulated by the R—Y signal at the transmitter is now 180° from its position in the previous field and therefore is 180° away from the position occupied during the line of the raster illustrated by the graph 72. The phase of the alternating current wave applied to the R—Y synchronous detector 32 is now also 180° away from its phase during the previous field by the color phase alternation circuit 38 so that the R—Y signal representing the red bar is recovered with the same polarity. However, the transmitted B—Y signal does not reverse. Therefore the spikes in the R—Y output 32 due to the presence of the B—Y signal do reverse.

Graph 80 indicates that successive negative and positive spikes 82 and 84 respectively are produced at the output of the B—Y synchronous detector 30 by the red bar, and the graph 85 shows that color phase alternation merely reverses the direction of the spikes during the next field. This latter reversal is explained in connection with Figure 3 where the spikes 82 and 84 are represented by the crosstalk vectors 58 and 60 respectively.

That the polarity of the spikes or pulses is as indicated in the graphs can be seen from the following analysis. Assume that the sideband frequencies deviate from the carrier frequency by a frequency F so that the amplitude of the upper sideband vectors 56′ of Figure 3 is zero, and therefore only the lower sideband vectors 54′ need be considered. In going from a gray region to a maximum R—Y signal as indicated by the signal 74 of the graph 72 in Figure 4 solid vector 54 of Figure 3 follows a locus 73 in the direction of the arrow so that its projection on the B—Y axis grows negative and the position is indicated by the negative crosstalk pulse 82 of the graph 80 in Figure 4. During the next field the dotted vector 54′ follows a locus 73′ in the direction of the arrow so as to produce a positive crosstalk pulse 82 shown in the graph 85. When the R—Y signal 74 goes back to zero the solid vector 54 and dotted vector 54′ continue and complete the circle 83.

The following discussion relates to the general manner in which the crosstalk elimination circuit 48 is included in the dotted rectangle of Figure 1 and operates to reduce or eliminate the crosstalk spikes 82 and 84 of Figure 4. The circuit may be comprised of a modulator 86 wherein the color carrier and its sidebands that are selected by the band pass filter 29 are heterodyned with a cosine wave during every field, a low pass filter 88, and a differentiation circuit 90. The low pass filter 88 prevents the signals passed by the band pass filter 29 from reaching the differentiation circuit and therefore performs the same function as the low pass filters 39 and 45. As pointed out in the discussion of these filters 39 and 45 the use of a doubly balanced modulator at 36 would make them unnecessary. Under some circumstances the low pass filter 88 could be dispensed with even if the modulator 86 was not balanced against the modulation signals applied to it from the band pass filter 29 as it may well be that the presence of those signals may not be harmful. Thus the low pass filter merely affords one way of eliminating these signals if it is desired to do so. During the first field, that is the field represented by the solid line vectors of Figure 3, the output of the modulator 86 is a positive R—Y signal such as indicated by the graph 92 of Figure 4. The signal is the same as the signal recovered by the R—Y modulator 32 during the first field as can be seen by comparing graphs 92 and 72 of Figure 4. During the first field the differentiation circuit 90 produces a signal such as indicated by the graph 94 having a positive pulse 96 at the leading edge of the red bar signal 74, and a negative pulse 98 at the trailing edge. By adding this signal to the output of the B—Y modulator 30 in the adder 46 the crosstalk pulses 82 ad 84 that appear in the B—Y signal are cancelled by the pulses 96 and 98 respectively.

During the second field the R—Y modulator 32 is supplied with a −cosine wave but the R—Y modulator 14 at the transmitter is also supplied with a −cosine wave as indicated by the dotted vectors of Figure 3 so that the R—Y signal 74 recovered by the R—Y modulator 32 still has a positive polarity as indicated by the graph 78. However, the modulator 86 that is included in the crosstalk elimination circuit 48 derives a negative R—Y signal 74 as indicated by the graph 100 of Figure 4. This is because the modulator 86 is still supplied with a +cosine wave. The differentiation of the negative R—Y signal produces a wave wherein the polarities of the pulses 96 and 98 reverse as indicated in the graph 102. However the crosstalk pulses 82 and 84 in the B—Y signal also reverse polarity during the second field as indicated by the graph 85 so that once again the addition of the two sets of pulses in the adder 46 produces a cancellation. This results in wave shape 103 of Figure 4 which is the output of adder 46.

Figure 5:
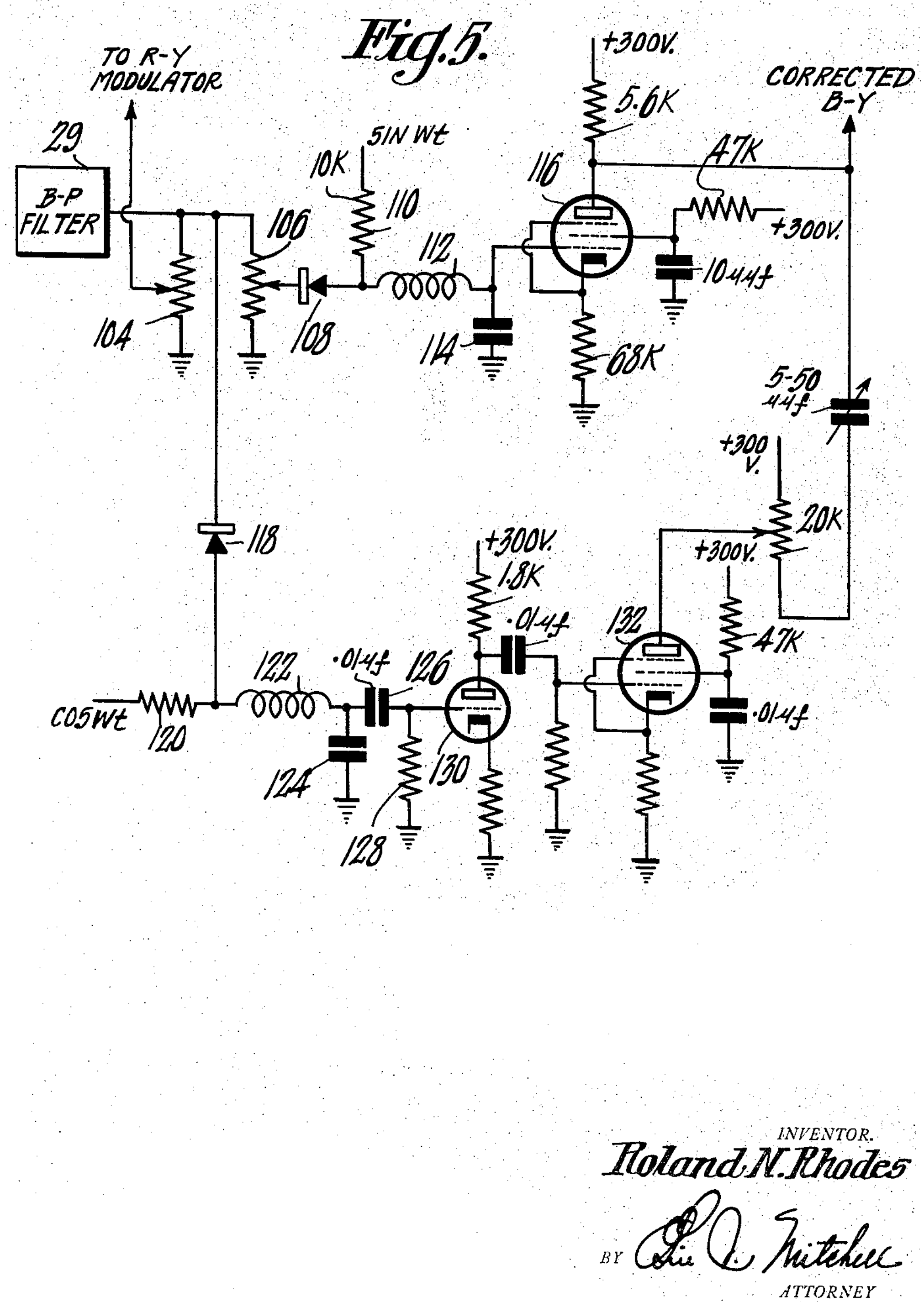
Figure 5 is a schematic diagram of a circuit embodying the principles of the invention.

Figure 5 illustrates one form that the crosstalk eliminator circuit may assume. The output of the band pass filter 29 is coupled by a potentiometer 104 to the R—Y modulator 32 not shown. It is also coupled via a potentiometer 106 to a non-linear device such as a crystal 108 wherein it is heterodyned with a sine wave supplied through an isolating resistor 110. An inductance 112 and a condenser 114 constitute the low pass filter 39 and the pentode 116 to which the low pass filter is coupled constitutes the adder 46. The output of the band pass filter 29 is also coupled to a non-linear device such as a crystal 118 whenever it is heterodyned with a +cosine wave supplied through a resistor 120. The signal thus derived is successively passed through a low pass filter comprised of an inductance 122 and a condenser 124 and a differentiation circuit comprised of a condenser 126 and a resistor 128. After amplification in amplifiers 130 and 132 a suitable portion of the output of the differentiation circuit is coupled to the plate of the adder 116 wherein it cancels the crosstalk passing through the amplifier.

The crosstalk that is introduced into the R—Y channel by the B—Y components of the signal can be cancelled by a crosstalk elimination circuit similar to the circuit 46. It is only necessary that the modulator of the circuit be supplied with the same alternating sine wave which is applied to the R—Y modulator.

Having thus described the invention, what is claimed is:

1. In a signal transmission system wherein the separate signals are represented by the amplitude of a single carrier at first and second phase angles, a circuit for recovering these signals from the carrier with a minimum of crosstalk from the output of a signal detector having a frequency characteristic that slopes in the vicinity of the carrier, said circuit comprising in combination a source of the carrier, a first source of waves of carrier frequency corresponding to the first phase, a first modulator coupled to said sources so as to modulate said waves of carrier frequency with said carrier and hence to recover the signal represented by the amplitude variations of the carrier at the first phase angle, a second source of waves of carrier frequency corresponding to the second phase, a second modulator coupled to the source of the carrier and to said source of waves of the second phase in such manner as to recover the amplitude variations of the carrier at the second phase angle, and a third source of waves of carrier frequency having a phase equal to the first phase angle, a third modulator coupled to said third source and said source of carrier so as to derive a signal represented by the amplitude variations of the carrier at the first phase angle, a differentiation circuit coupled to the output of said third modulator, and an adder coupled to the output of said second modulator and said differentiation circuit.

2. In a signal transmission system wherein the phase and amplitude of a carrier are controlled by the relative value of repeated sequence of a plurality of independent variables, apparatus for recovering signals representing the variables from said carrier with a minimum of crosstalk from the output of a signal detector having a frequency response characteristic that slopes in the vicinity of the carrier comprising in combination a source of unmodulated waves of the carrier frequency and having a first predetermined phase, a first means for heterodyning the waves of the first phase with said carrier, a second source of waves of carrier frequency having a second predetermined phase, a second means for heterodyning the waves of the second phase with the carrier, a third means for heterodyning the waves of the first phase with the carrier, means for differentiating the output of said third heterodyning means and an adder coupled to the output of said second heterodyning means and said differentiating means.

3. In a signal transmission system wherein a phase and amplitude modulated carrier may be derived by combining the products of modulation obtained by amplitude modulating waves of carrier frequency having a first phase in accordance with a first signal and by amplitude modulating waves of carrier frequency having a second phase with a second signal, apparatus for recovering the signals with a minimum of crosstalk after the carrier has been detected by a detector having a frequency response characteristic that slopes in the vicinity of the carrier comprising in combination a source of unmodulated waves of the carrier frequency and having a first predetermined phase, a first means for heterodyning the waves of the first phase with said carrier, a second source of waves of carrier frequency having a second predetermined phase, a second means for heterodyning the waves of the second phase with the carrier, a third means for heterodyning the waves of the first phase with the carrier, means for differentiating the output of said third heterodyning means and an adder coupled to the output of said second heterodyning means and said differentiating means.

4. In a color television system where during a first field a first phase of a wave is amplitude modulated in accordance with a first color signal, a second phase of the wave is amplitude modulated in accordance with a second color signal and wherein the phase of the first wave is shifted by 180° during a second field, the amplitude modulated waves being combined to form a color carrier during both fields, apparatus for recovering the first and second color signals from the color carrier during the first and second fields with a minimum of crosstalk comprising in combination a first source of waves of the first phase during the first field and the opposite phase during the second field, first means for heterodyning the color carrier with the waves provided by said first source, a second source of waves having the second phase during both fields, means for heterodyning the waves provided by said second source with the color carrier, a third source of waves having the first phase during both fields, third means for heterodyning the waves supplied by the third source with the color carrier, a differentiation circuit coupled to the output of the third heterodyning means, and an adder coupled to the output of said second heterodyning means and said differentiation circuit.

No references cited.